A. B. DAVIS.
Weighing Apparatus.
No. 37,569. Patented Feb. 3, 1863.
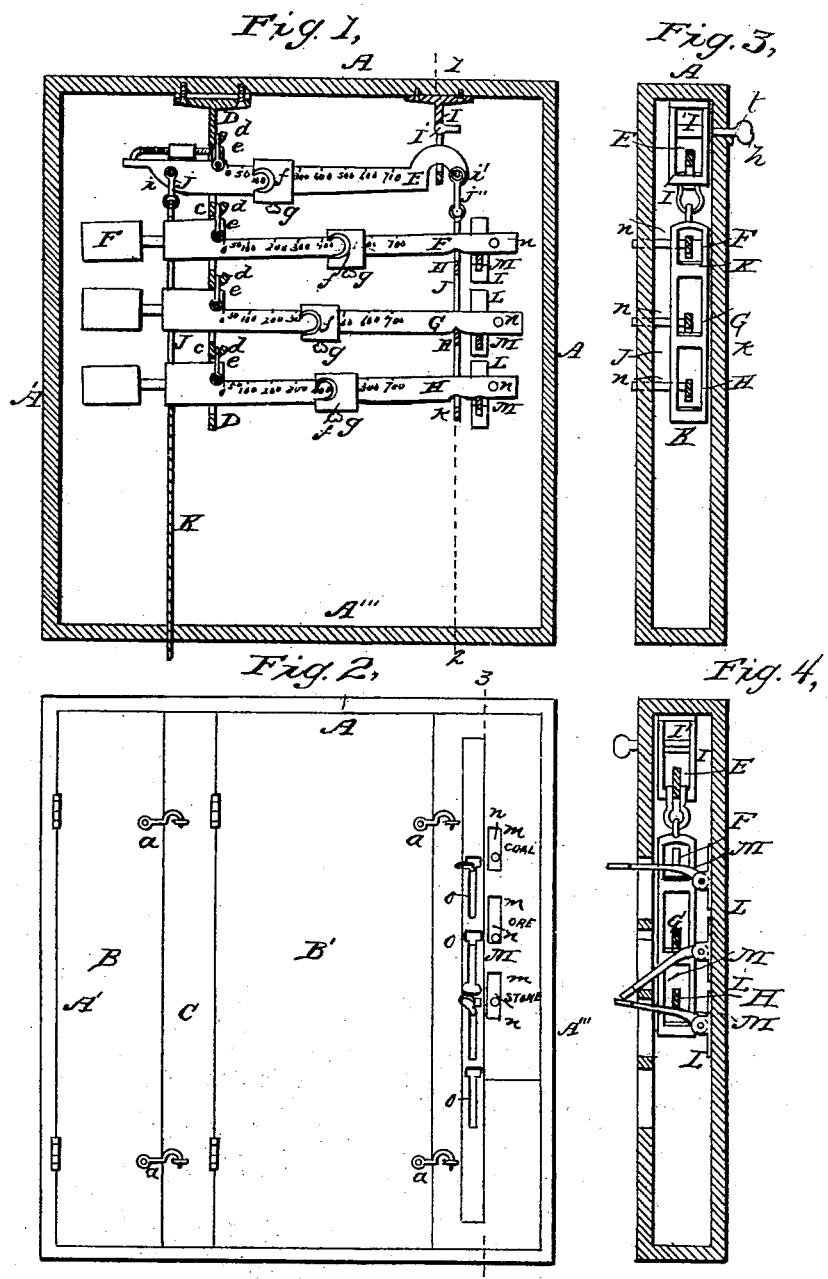
WITNESSES,
INVENTOR:

UNITED STATES PATENT OFFICE.

AUGUSTUS B. DAVIS, OF PHILADELPHIA, PENNSYLVANIA.

IMPROVEMENT IN WEIGHING APPARATUS.

Specification forming part of Letters Patent No. 37,569, dated February 3, 1863.

*To all whom it may concern:*

Be it known that I, AUGUSTUS B. DAVIS, of Philadelphia, Pennsylvania, have invented a new and Improved Weighing Apparatus; and I do hereby declare the following to be a full, clear, and exact description of the same, reference being had to the accompanying drawings, and to the letters of reference marked thereon.

My invention consists of weighing apparatus fully described hereinafter, whereby the desired quantity of different substances can be readily and accurately ascertained without any adjustment or alteration of the apparatus and without any knowledge on the part of the attendants as to the weight determined by the apparatus, the adjustment of which is under the control of one responsible person, the attendants, whose duty it is to ascertain the proper quantity of materials, being unable to gain access to and tamper with the adjustable parts.

In order to enable others skilled in the construction and operation of weighing apparatus to make and use my invention, I will now proceed to describe its construction and operation.

On reference to the accompanying drawings, which form a part of this specification, Figure 1 is a front view, partly in section, of my improved weighing apparatus; Fig. 2, an exterior front view; Fig. 3, a transverse vertical section of Fig. 1 on the line 1 2, and Fig. 4 a transverse vertical section of Fig. 2 on the line 3 4.

Similar letters refer to similar parts throughout the several views.

A is a box or casing, inclosing my improved weighing apparatus, and to the front of this box are hinged the two doors B and B', each being provided with a suitable lock. To the top of the case is secured a hanger, D, having four oblong openings for the admission of the four graduated beams E, F, G, and H, each of which is suspended by a clevis, $e$, to a projection, $d$, on the hanger. Each graduated beam is furnished with an adjustable weight, $f$, which can be secured in any desired position after adjustment, by a set-screw, $g$. To knife-edges $i$, on the upper beam, E, is suspended a clevis, $j$, to which is connected a yoke, J, the opening in the latter being sufficiently large to permit the graduated beams to move freely therein, a rod, K, connected to the levers of an adjacent platform-scale, forming a continuation of the yoke J. The front end of the upper beam E passes through a hanger, I, secured to the top of the box, this hanger being furnished with a pawl, I', connected to a rod, $h$, which passes through the front of the box, and which on the outside of the latter is furnished with a suitable handle. To knife-edges $i'$, near the front end of the beam E, is suspended a clevis, $j''$, and to the latter is suspended what I term the "stirrup" J', which consists of a plate having openings separated from each other by cross-bars $k$. One of the three beams, F G or H, passes through each opening, which is of such dimensions as to permit the beam to vibrate freely on its fulcrum to a limited extent. The upper edge of each of the cross-bars $k$ of the stirrup J' has a knife-edge, and is adapted to a notch on the under side of each beam for a purpose which will be rendered apparent hereinafter.

L L L are three brackets secured to the back of the box, and to each bracket is hung a lever, M, each lever passing through a T-formed slot, $o$, in front of the box, and each lever being so arranged in respect to one of the three beams F, G, or H that when the lever is elevated so as to occupy a position in the top of one of the slots it will support one of the beams in a position elevated above one of the knife-edged cross-bars $k$ of the stirrup. When the lever is lowered, however, so as to bear on the bottom of the slot, the beam will rest on one of the said cross-bars. From each of the beams F, G, and H a pin, $n$, projects through a slot, $m$, in front of the box, and near each slot the name of the material to be weighed by the beam adjacent to that slot is painted or otherwise marked, the materials in the present instance being coal, iron, and stone, as shown in Fig. 2.

Although my invention is applicable generally to the weighing of different materials of given but different proportions, to be subsequently mixed together, it is especially well adapted to the weighing of the coal, ore, and stone or flux used in the manufacture of iron, I shall therefore confine my description of the operation of the apparatus in connection with this branch of industry.

In manufacturing cast-iron it has been the practice in some instances to use one beam or scale to weigh the different materials to be deposited in the furnace, and to alter the weights to suit the different quantities of these materials. In other instances as many beams or scales are used as there are materials to be weighed. In both cases delay as well as inaccuracies must take place, the scales or beams being exposed and the adjustment of the weights under the control of the unskilled laborers, who wheel the materials in a barrow onto the platform, and who, through ignorance or carelessness, may alter or tamper with the scales, and consequently discharge into the furnace improper proportions of the different materials. The graduated beam E is similar to those of other weighing apparatus, and is arranged to balance, or, rather, indicate the weight of the car or wheelbarrow in which the materials to be weighed are contained. In other words, this beam is arranged to indicate the tare, the next beam, f, being arranged to indicate the weight of the coal, the third beam being for the ore, and the fourth or last beam for the stone or flux.

In using my improved weighing apparatus, the first step to take is to ascertain the weight of the cars or barrows in which the material to be weighed is contained. If three barrows be used, one weighing ninety-five, a second ninety-nine, and the third one hundred and six pounds, the weight f on the upper beam, E, is adjusted to and secured in such a position on the said beam as to balance one hundred pounds, that being the average weight of the barrows. If, to make a particular quality of iron, four hundred pounds of coal and one hundred pounds of stone and flux are required for three hundred pounds of ore, the weights f are adjusted on the several beams in the proper position for weighing these amounts. The beams having been thus regulated by the manager or responsible superintendent of the furnace, he closes the two doors B and B' and locks them so that no one but himself can obtain access to the beams and alter the position of the weights. Preparatory to the weighing of the materials the pawl I is turned down, so as to prevent unnecessary agitation of the beams, and the whole of the levers M are elevated so that the three beams F, G, and H may be raised free from contact with the knife-edged cross-bars K of the stirrup J'. Supposing that a barrow or car-load of ore be now wheeled onto the platform of the weighing apparatus, the pawl I is in the first instance turned up so as to set the beam E at liberty; then the lever M, below the beam G, is lowered so that the latter may rest on one of the cross-bars of the stirrup J', when it is at once in a position to operate in unison with the beam E, the other beams, F and H, remaining stationary and disconnected from the said beam E. After thus lowering the lever M and beam G the attendant watches the pin n, which projects from the said beam, and if the pin, by taking a position midway, or thereabouts, between the top and bottom of the slot m, through which it passes, shows that the beam G is balanced, the load of ore is of the desired weight. If the load be deficient in weight, the pin will strike the top of the slot, and if the weight be excessive the pin will strike the bottom of the slot, thereby instructing the attendant whether to add to or abstract from the load. The proper quantities of coal or stone can in like manner be readily ascertained by placing loads of the same on the platform and then lowering the beams F or H onto the knife-edged cross-bars of the stirrup. It will now be seen that the desired weight of any number of different ingredients can be ascertained by using a corresponding number of beams and without any adjustment of the weights. As the laborer who places the material on the platform cannot gain access to the beams, and has no further knowledge of the weight indicated by the pins n than that the weight, whatever it may be, is sufficient, there can be no tampering with or ignorant or careless handling of the beams and weight, the latter remaining fixed until the superintendent in charge of the keys of the box or case alters the weights, when a change in the proportion of the ingredients is demanded by the condition of the furnace or a proposed change in the quality of iron to be manufactured.

A series of beams arranged and operating substantially as described may be used with advantage in rapidly and accurately weighing any desired quantity of different ingredients to be subsequently mixed together, as, for instance, the different substances of which many paint compounds are composed, different ingredients for dyeing, &c.

I claim as my invention and desire to secure by Letters Patent—

1. A graduated beam, E, connected to the platform of a scale, in combination with any desired number of supplementary graduated beams so arranged that, by the appliances herein described or any equivalent to the same, any one or all of the said supplementary beams can be connected to or disconnected from the main graduated beams, for the purpose specified.

2. Arranging the graduated beam E and its supplementary graduated beams within a box or casing furnished with doors and locks substantially as described, and having such openings that while the attendant can observe the movements of any of the supplementary beams from the outside of the casing he cannot gain access to the beams themselves or gain a knowledge of the weights determined by the beams.

3. The stirrup J', suspended from the graduated beam E, and provided with knife-edged bearings $k$, for the reception of the supplementary beams, substantially as and for the purpose herein set forth.

4. The levers M, arranged in respect to the supplementary graduated beams and stirrup J', substantially as and for the purpose herein specified.

In testimony whereof I have signed my name to this specification in the presence of two subscribing witnesses.

A. B. DAVIS.

Witnesses:
 HENRY HOWSON,
 JOHN WHITE.